United States Patent
Wunsch et al.

(10) Patent No.: US 11,482,199 B2
(45) Date of Patent: Oct. 25, 2022

(54) STRING INSTRUMENT EMULATING AND STRING TENSION MEASURING APPARATUS AND METHOD OF USING SAME

(71) Applicant: Guitar Supplies On Line, Inc., Traverse City, MI (US)

(72) Inventors: John Andrews Wunsch, Traverse City, MI (US); Daniel Joseph Kelchak, Traverse City, MI (US); Benjamin T Richey, Traverse City, MI (US)

(73) Assignee: Guitar Supplies On Line, Inc., Traverse City, MI (US)

( * ) Notice: Subject to any disclaimer, the term of this patent is extended or adjusted under 35 U.S.C. 154(b) by 0 days.

(21) Appl. No.: 17/396,307

(22) Filed: Aug. 6, 2021

(65) Prior Publication Data
US 2022/0044657 A1 Feb. 10, 2022

Related U.S. Application Data

(60) Provisional application No. 63/062,221, filed on Aug. 6, 2020.

(51) Int. Cl.
*G10D 3/10* (2006.01)
*G10D 3/14* (2020.01)
*G01L 5/04* (2006.01)
*G01L 5/06* (2006.01)

(52) U.S. Cl.
CPC ............. *G10D 3/14* (2013.01); *G01L 5/047* (2013.01); *G01L 5/06* (2013.01); *G10D 3/10* (2013.01)

(58) Field of Classification Search
CPC ... G10D 3/14; G10D 3/10; G10D 1/05; G01L 5/047; G01L 5/06; G01L 5/042; G10G 7/00
See application file for complete search history.

(56) References Cited

U.S. PATENT DOCUMENTS

| | | | |
|---|---|---|---|
| 7,045,693 B2 | 5/2006 | Rose | |
| 7,812,243 B2 | 10/2010 | Celi et al. | |
| 9,792,886 B2 | 10/2017 | Lyles | |
| 10,224,009 B2 | 3/2019 | Lyles | |
| 2012/0036982 A1* | 2/2012 | Sullivan | G10H 3/188 84/724 |

* cited by examiner

*Primary Examiner* — Kimberly R Lockett
(74) *Attorney, Agent, or Firm* — Traverse Legal, PLC

(57) ABSTRACT

An apparatus for emulating a variety of string instruments with a variety of configurations in order to measure the resulting, actual tension of a string on that instrument. The tension may be measured in real-time.

17 Claims, 14 Drawing Sheets

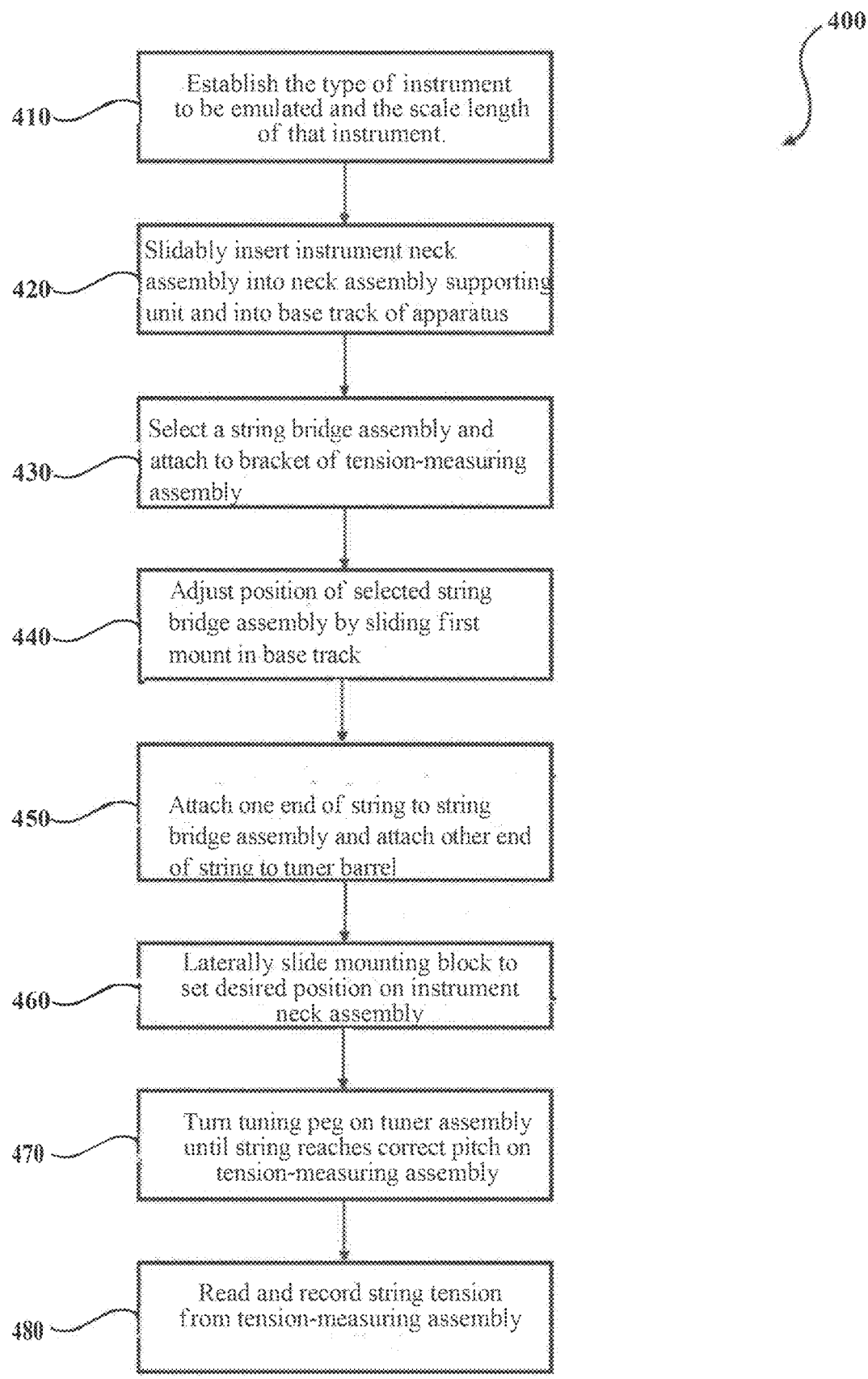

STRING INSTRUMENT EMULATING AND STRING TENSION MEASURING APPARATUS AND METHOD OF USING SAME

CROSS REFERENCE TO RELATED APPLICATIONS

The present application claims the benefit to U.S. Provisional Patent Application No. 63/062,221 filed on Aug. 6, 2020, which is incorporated herein by reference in its entirety.

FIELD

The present disclosure generally relates to an apparatus for emulating a string instrument in order to measure the tension of a string on the instrument.

BACKGROUND

Players of various instruments benefit from accurately knowing the actual tension of a string on a particular instrument. String tension affects the tone, volume, and sustain of an instrument, which impacts the sonic quality and the performance of the instrument. Additionally, string tension impacts the response of the instrument experienced by a player, and the function and health of a player's hands. By knowing the actual tension of a given string on an instrument, as opposed to the generic, theoretical tension currently available, the player of the instrument may better predict the appropriate strings for the instrument.

Current techniques for determining string tension use formulas based upon the string length from end points of the vibrating portion of the string. However, these techniques fail to account for the additional lengths of non-vibrating portions on a string created by varying extensions of the string beyond the vibrating portion, which impacts the actual tension of the string. As a result, the actual tension of a string may not be accurately determined by measuring only the vibrating portion of the string or by measuring just one common length of the string. Consequently, there is a need for an apparatus that may emulate a variety of string instruments with a variety of vibrating section lengths and extension configurations.

SUMMARY

What is provided is an apparatus for emulating a variety of string instruments with a variety of configurations in order to measure the resulting, actual tension of a string on that instrument. The tension may be measured in real-time.

In an embodiment, a string tension measuring apparatus includes an elongated body having a first end and a second end, and one or more tracks, wherein one or more rulers are positioned along the elongated body. The apparatus also includes a tension-measuring assembly mounted to the tracks on the first end of the body for longitudinal adjustment along the body, wherein the tension-measuring assembly includes a string bridge assembly flexibly supported by the tension-measuring assembly. The string bridge assembly includes a string bridge mounted on a substrate. The apparatus further includes a string nut assembly secured to the tracks; a headstock assembly mounted to the tracks on the second end of the body for longitudinal and height adjustment relative to the string nut assembly, wherein the headstock assembly comprises a tuning assembly for securing upper ends and adjusting tension of instrument strings under tension; and a display device in communication with the tension-measuring assembly for displaying the tension of instrument strings secured under tension between the string bridge assembly and the tuning assembly.

In an alternative embodiment, a string tension measuring apparatus includes an elongated body having first end and a second end, and a first set of tracks, wherein one or more rulers are positioned along the elongated body. The apparatus also includes a tension-measuring assembly mounted on the first set of tracks on first end of the body for longitudinal adjustment along the body, wherein the tension-measuring assembly includes a string bridge assembly flexibly supported by the tension-measuring assembly, and wherein the string bridge assembly includes a string bridge mounted on a substrate. The apparatus further includes an instrument neck assembly slidably connected to the second end of the body, wherein the instrument neck assembly includes a headstock having one or more tuning assemblies, wherein the tuning assemblies are configured to receive an end of instrument string and adjust tension of instrument strings under tension; a neck portion adjacent to the headstock, wherein the neck portion includes a fretboard; a nut interposed between the headstock and the neck portion; a neck assembly supporting unit mounted to the first set of tracks; and a mounting block attached to the body. The apparatus also includes a display device in communication with the tension-measuring assembly for displaying the tension of instrument strings.

In an embodiment, a method of measuring the tension of a string on an instrument includes providing a string tension measuring apparatus, the apparatus includes an elongated body having a first end and a second end; one or more tracks; a tension-measuring assembly mounted to the tracks on the first end of the body; and a display device in communication with the tension-measuring assembly. The method further includes establishing the type of instrument to be emulated and the scale length of the instrument; slidably inserting a combination of a string nut-supporting unit and a string nut assembly, into one or more tracks of the body; selecting an appropriate string bridge assembly for the instrument to be emulated; attaching the selected string bridge assembly to a bracket on the tension-measuring assembly; adjusting the position of the selected string bridge assembly by sliding a mount into one or more of the tracks; establishing an angle of a headstock and the distance from the a tuning barrel to a string nut for the instrument to be emulated; slidably inserting a tuning assembly including one or more tuning pegs and a tuning barrel into one or more of the tracks; attaching one end of the string to the selected string bridge assembly and the other end of the string to the tuning barrel; turning the tuning peg; and reading and recording the tension of the string using the display device.

In another embodiment, a method of measuring the tension of a string on an instrument includes providing a string tension measuring apparatus, the apparatus includes an elongated body having a first end and a second end; one or more tracks; a tension-measuring assembly mounted to the tracks on the first end of the body; one or more tuning assemblies, wherein each of the tuning assemblies includes one or more tuning pegs and one or more tuning barrels; and a display device in communication with the tension-measuring assembly. The method also includes establishing the type of instrument to be emulated and the scale length of the instrument; slidably inserting a combination of an instrument neck assembly and a neck assembly supporting unit into one or more tracks of the body; selecting an appropriate string bridge assembly for the instrument to be emulated; attaching the selected string bridge assembly to a bracket on the tension-measuring assembly; adjusting the position of the selected string bridge assembly by sliding a mount into one or more of the tracks; attaching one end of the string to the selected string bridge assembly and the other end of the string to the tuning barrel; laterally sliding a mounting block to set a desired position on the inserted instrument neck assembly; turning the tuning peg; and reading and recording the tension of the string using the display device.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 14 illustrates an exemplary method for measuring the tension of a string on an instrument using the apparatus illustrated in FIGS. 10-12.

DETAILED DESCRIPTION

Figure 1:
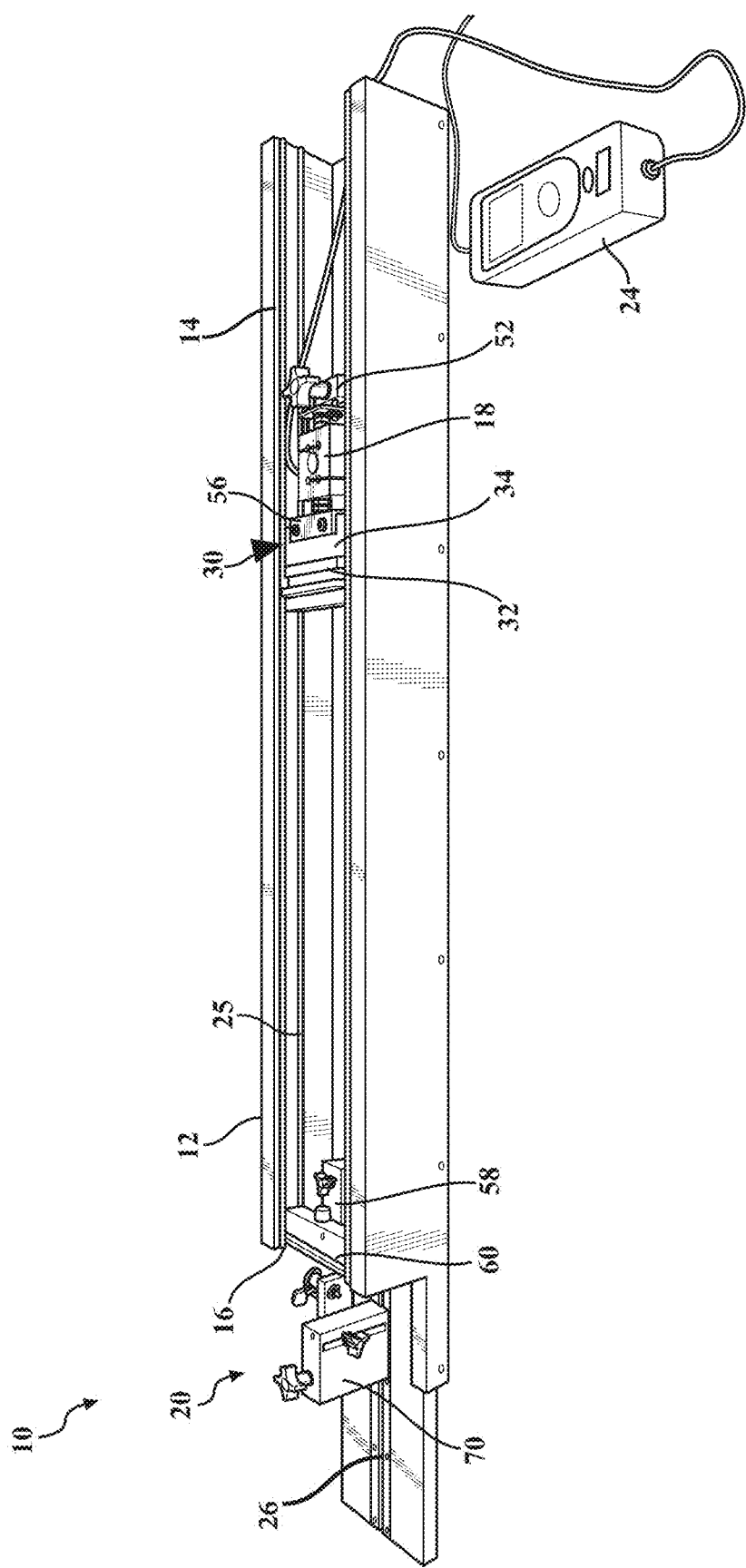
FIG. 1 illustrates a schematic side, perspective view of a string instrument emulating and tension measuring apparatus according to an embodiment of the disclosure.

It is to be understood that the present disclosure may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

The string instrument emulating and tension measuring apparatus disclosed herein measures string tension by emulating one or more string instruments, including, but not limited to a guitar (electric, acoustic, classical, or bass), a banjo, a viola, a cello, a violin, a sitar (including acoustic and electric versions of such instruments), and the like. Rather than attaching to string instruments, the string instrument emulating and tension measuring apparatus is a single apparatus that may measure string tension taking into account a variety of conditions and instrument configurations. In doing so, the string instrument emulating and tension measuring apparatus, may, for example, recreate potential head stock positions, headstock dimensions, nut placement positions, nut placement angles, nut designs, bridge styles, specific bridge types, and neck dimensions of a string instrument.

FIGS. 1-6 illustrate views of a string instrument emulating and tension measuring apparatus 10 according to an embodiment of the disclosure. The apparatus 10 comprises an elongated body 12 having a first end 14 and a second end 16. The elongated body 12 includes a base track 26 mounted to the floor of the elongated body 12 and extending along the entire length of the elongated body 12. The base track 26 is made of a rigid material, such as a metal, a rigid plastic, and any combinations thereof. The base track 26 is configured to accommodate and secure one or more components of the apparatus 10 in place to emulate the specific characteristics of a given instrument to allow for measuring the tension of a string 44 at a given pitch and within a given configuration.

Figure 5:
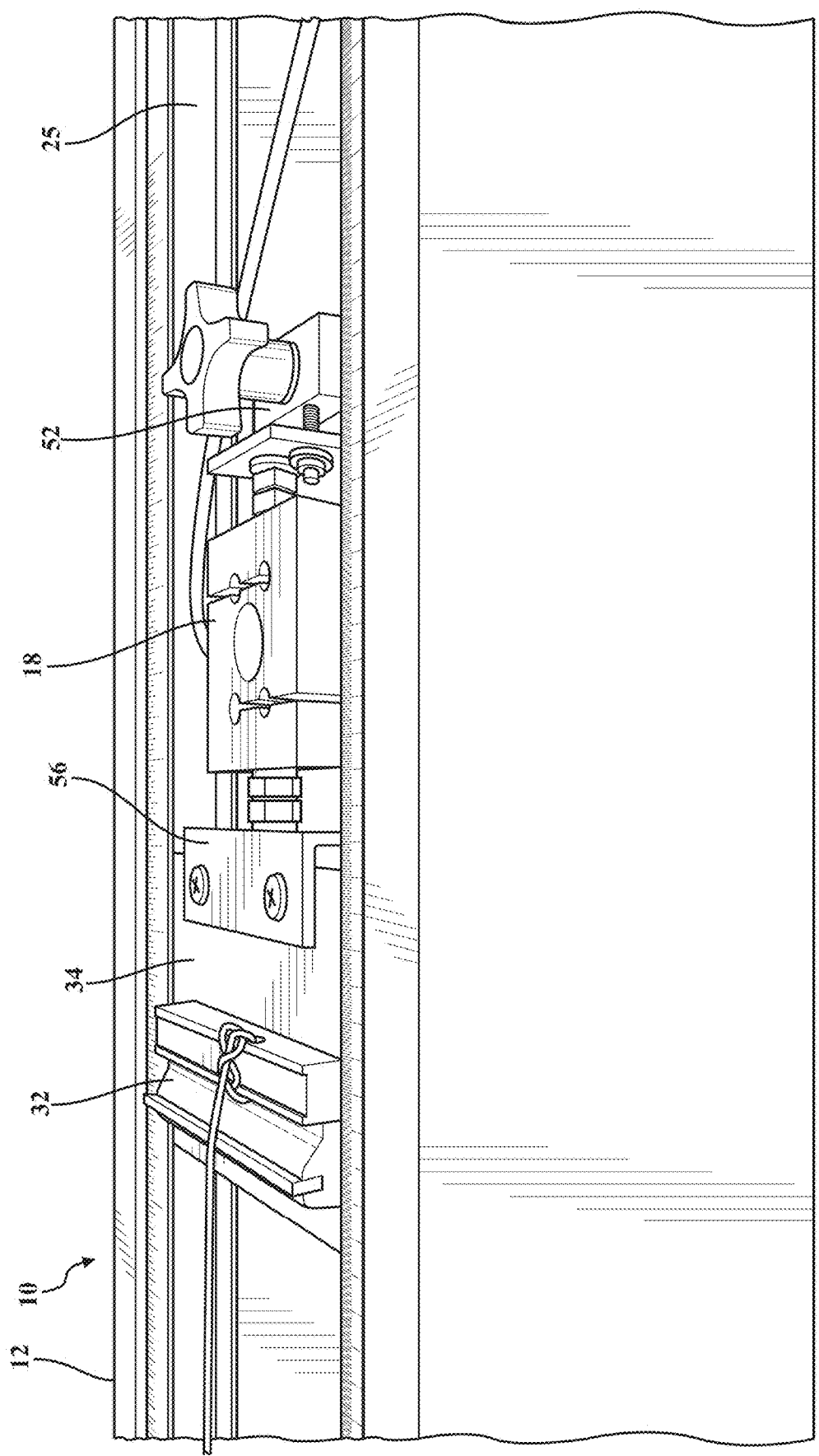
FIG. 5 illustrates a schematic side, perspective view of a portion of the tension-measuring assembly illustrated in FIG. 4.
Figure 6:
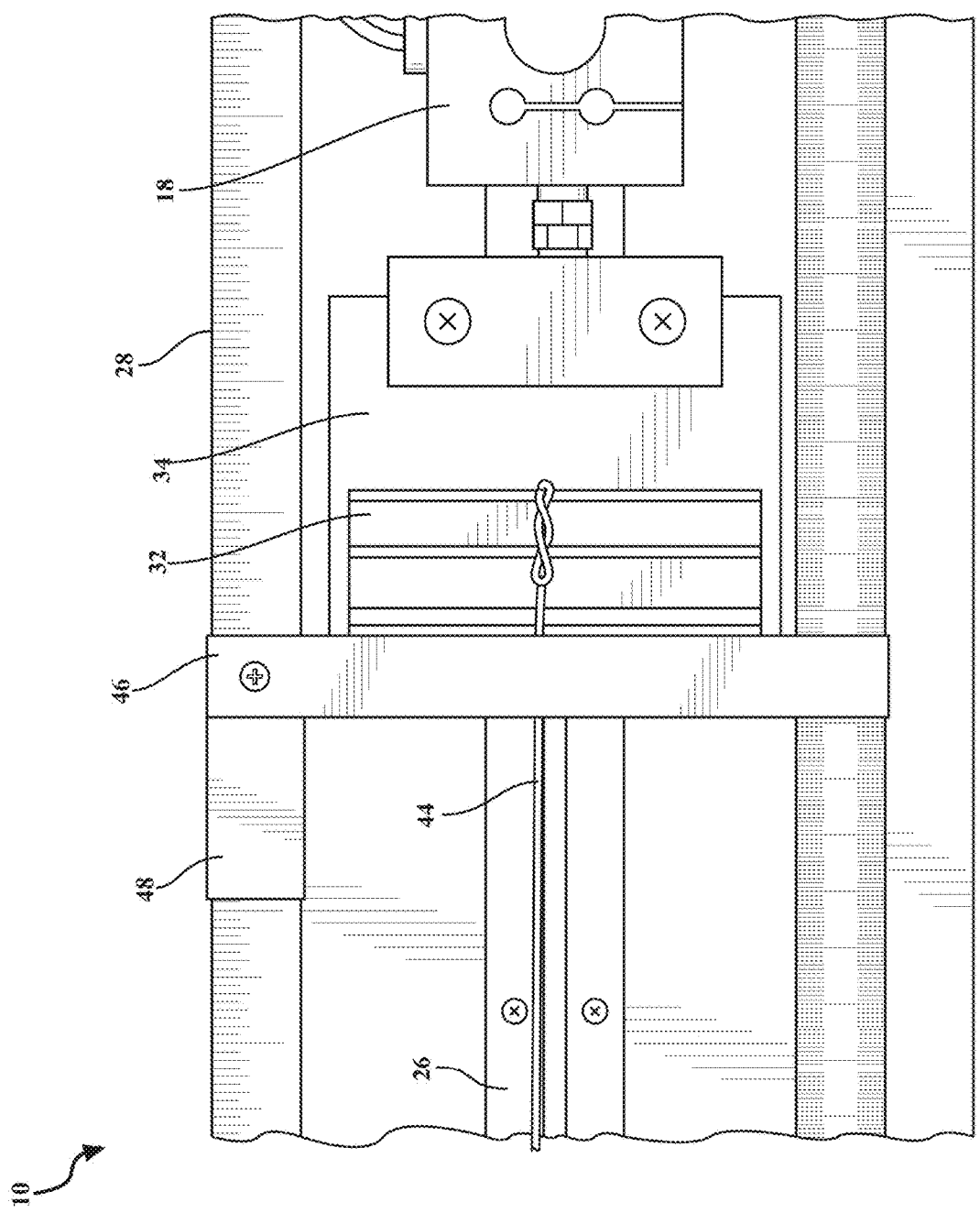
FIG. 6 illustrates a schematic top view of a portion of the assembly illustrated in FIGS. 4 and 5, wherein the assembly includes a visual alignment unit.

In an embodiment, the apparatus 10 further comprises two side tracks 25 mounted on interior portions of opposing, vertical side walls of the elongated body 12. The side tracks 25 are made of a rigid material, such as a metal, a rigid plastic, and any combinations thereof, and may be oriented to face each other. As best seen in FIGS. 1, 5, and 6 and as a non-limiting example, two rulers 28 are positioned along the length of the elongated body 12. Each of the rulers 28 is mounted on top of one of the side tracks 25. In an embodiment, one of the rulers 28 measures scale length of the string 44 in metric and the other ruler 28 measures scale length of the string 44 in U.S. standard.

Figure 4:
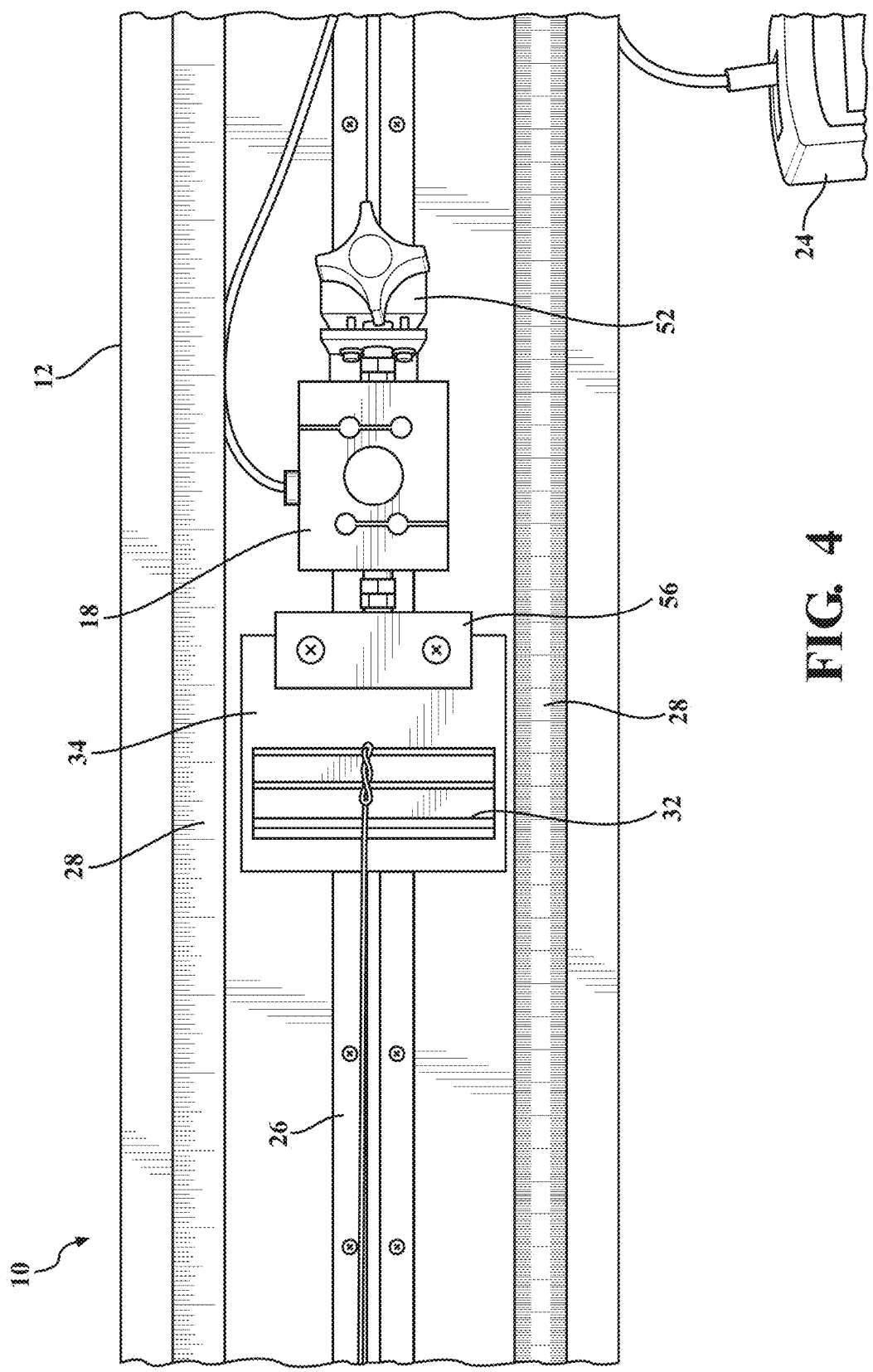
FIG. 4 illustrates a schematic top view of a portion of the apparatus illustrated in FIGS. 1-3 having a tension-measuring assembly.

As best seen in FIGS. 1, 4, and 5, and as a non-limiting example, a tension-measuring assembly 18 is mounted to the base track 26 at the first end 14 of the elongated body 12. The tension-measuring assembly 18 is configured to measure the tension of the string 44. The position of the tension-measuring assembly 18 may be adjusted and supported at one end by a mount 52 having a knob, wherein the knob tightens to secure the tension-measuring assembly 18 in a particular position. The mount 52 is affixed to and moves along the base track 26. The mount 52 may be made from a variety of rigid materials, including wood, plastic, metal, and any combinations thereof.

At the other end, the tension-measuring assembly 18 may be rigidly attached to a cantilevered bracket 56, wherein the bracket 56 is configured to support a string bridge assembly 30. The bracket 56 is rigidly affixed to the tension-measuring assembly 18 by a threaded bolt. The bracket 56 may be made from a variety of rigid materials, including wood, plastic, metal, and any combinations thereof.

In an embodiment, the string bridge assembly 30 comprises a bridge substrate 34 selectively attached to the bracket 56 and a string bridge unit 32, wherein the bridge unit 32 is mounted to the bridge substrate 34. The bridge substrate 34 may be made from a variety of materials, including wood, metal, plastic, and any combinations thereof. The bridge unit 32 comprises a receiver portion configured for securing one or more ends of the string 44 under tension.

Figure 7:
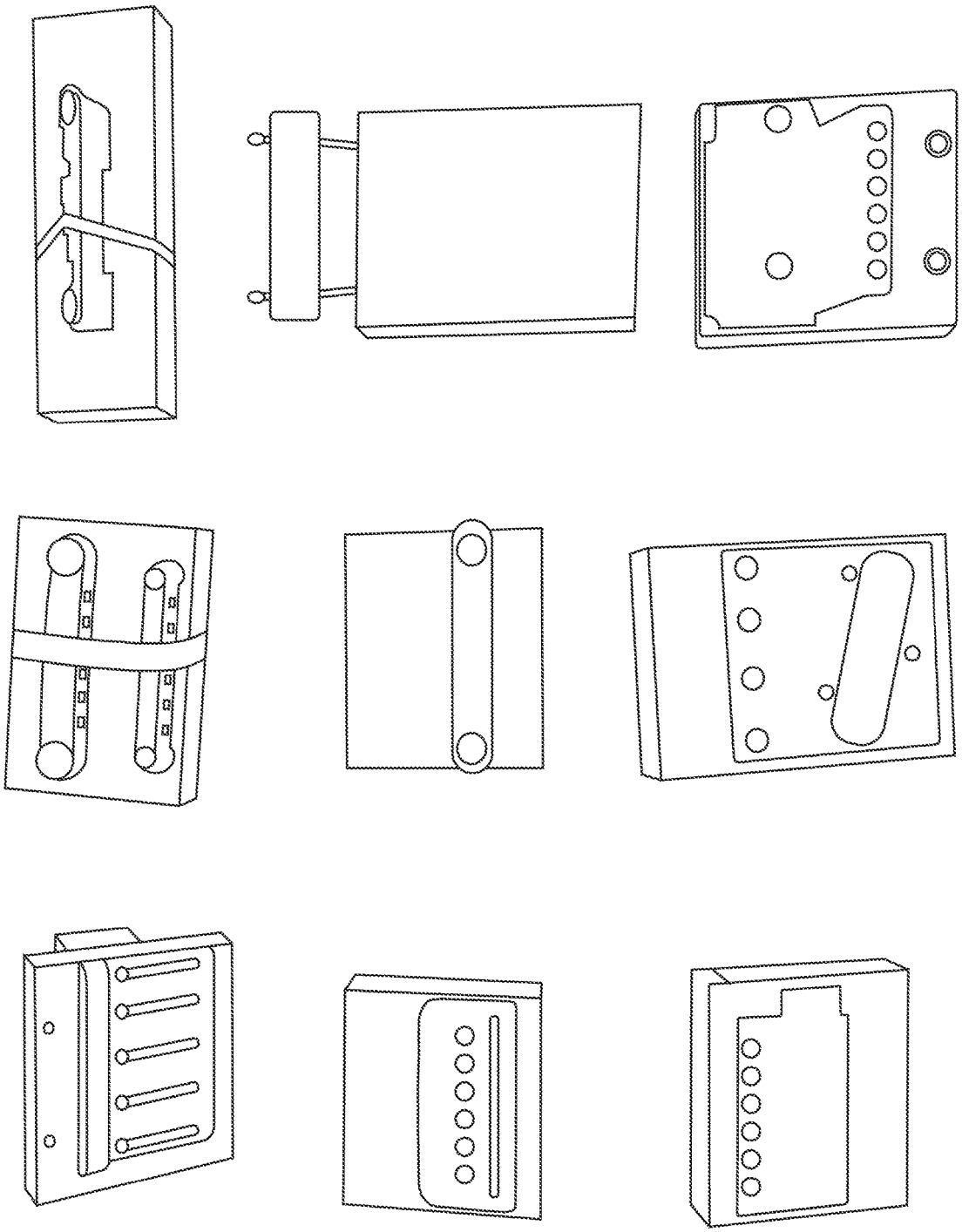
FIG. 7 illustrates a perspective view of a plurality of exemplary bridge assemblies for use with the apparatus illustrated in FIGS. 1-6.

One of ordinary skill in the art would understand that a variety of bridge assemblies may be used with the apparatus 10, wherein the bridge assemblies vary based on different instrument configurations. FIG. 7 is a perspective view of a plurality of alternative bridge units having different configurations, sizes, and shapes, so long as the bridge units include one or more receiver portions for engaging with portions of various instrument strings. The type of bridge assemblies in use affect string length through changing instrument configurations and thereby the tension of instrument strings, since total string lengths affect tension.

As best seen in FIG. 6 and as a non-limiting example, a visual alignment unit 46 extends perpendicularly across the two rulers 28 such that the visual alignment unit 46 overlaps at least a portion of the bridge substrate 34. The visual alignment unit 46 comprises a perpendicular portion 48 to align and support the visual alignment unit 46 along the rulers 28. The visual alignment unit 46 is configured to help visually determine the precise placement of end points of the vibrating length of the string 44. The visual alignment unit 46 may have a variety of shapes and configurations so long as it has a right angle in order to establish correct alignment of the end points of the vibrating length. The visual alignment unit 46 may be constructed of a variety of suitable materials, including wood, plastic, metal, and any combinations thereof.

In an alternative embodiment, a digital protractor is used to establish correct alignment of the end points of the vibrating length. The digital protractor may overlap at least a portion of a bridge substrate.

As best seen in FIGS. 1 and 4, the tension-measuring assembly 18 is in communication with a display device 24 either through wireless or wired interfaces. The display device 24 is configured to display the tension of the string 44 measured by the tension-measuring assembly 18. Wireless interfaces may provide for communication under one or more wireless communication protocols, such as Bluetooth, Wi-Fi, LTE, RFID protocol, and/or other wireless communication protocols.

In an embodiment, the display device 24 rests on top of a display device mount such that the display device 24 is secured between two side tracks 25 mounted on interior portions of opposing, vertical side walls of the elongated body 12.

Figure 2:
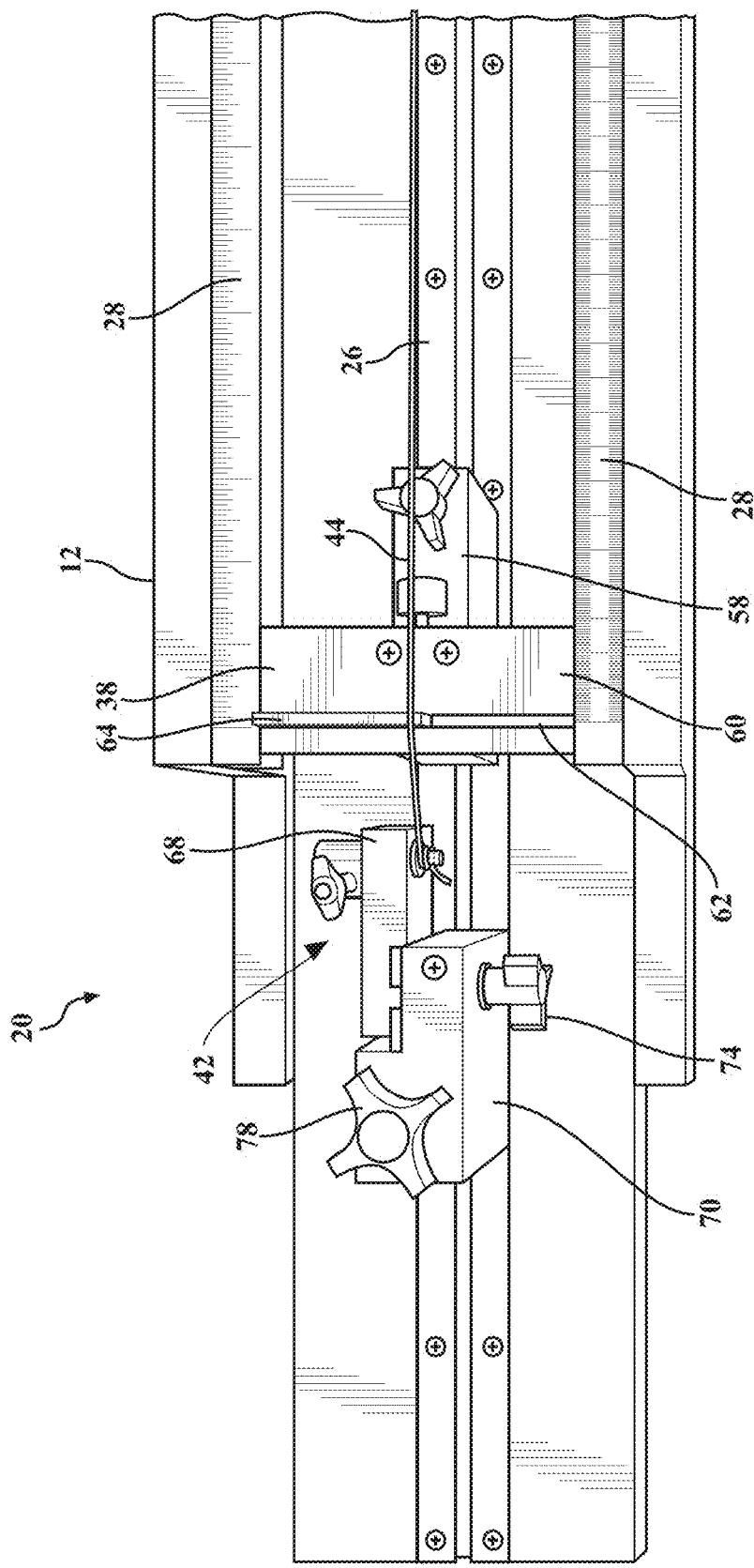
FIG. 2 illustrates a schematic top, perspective view of a portion of the apparatus illustrated in FIG. 1.
Figure 3:
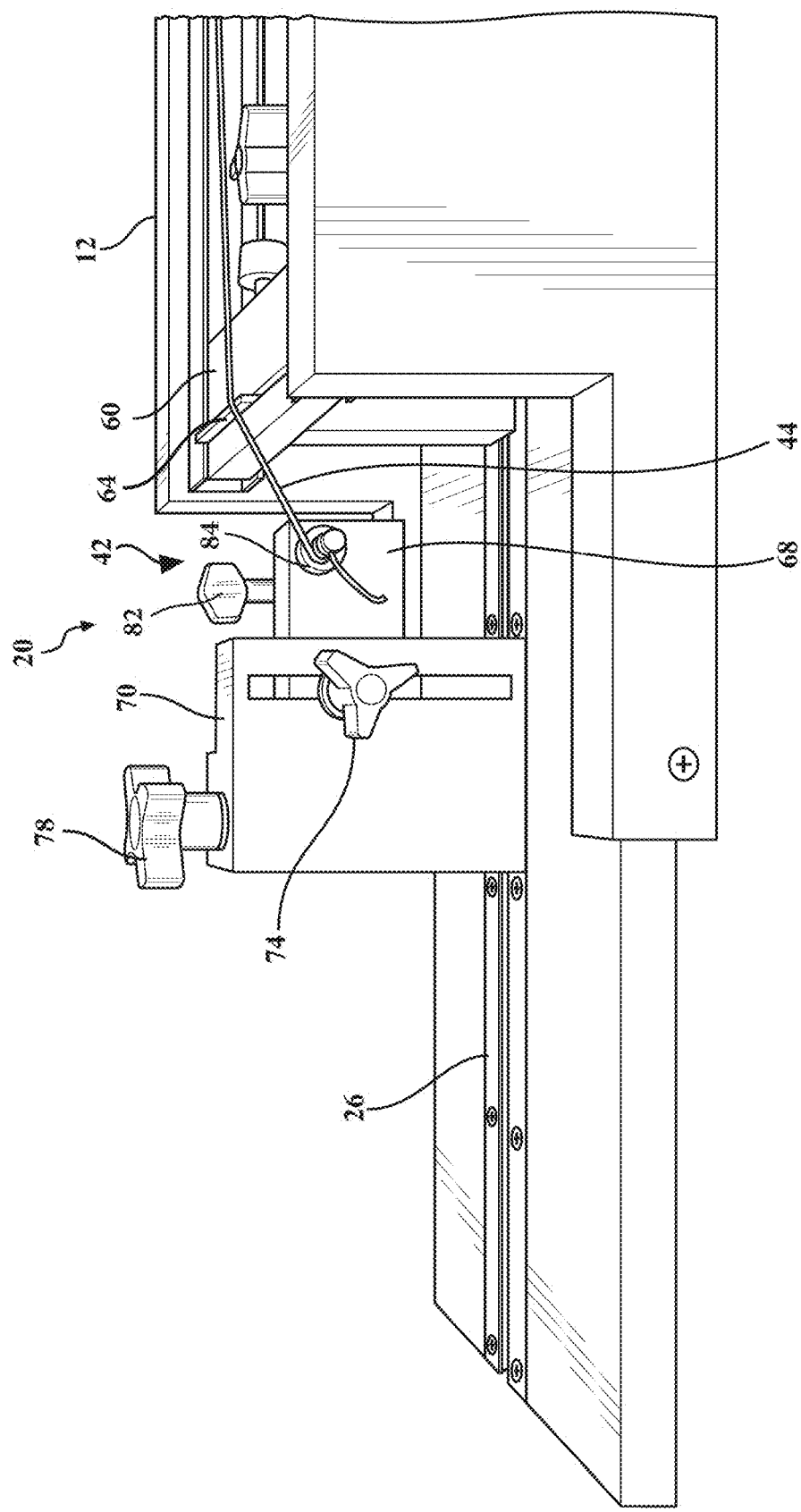
FIG. 3 illustrates a schematic side, perspective view of a portion of the apparatus illustrated in FIGS. 1 and 2.

As best seen in FIGS. 1-3 and as a non-limiting example, a headstock assembly 20 is mounted at the second end 16 of the elongated body 12, namely the base of the elongated body 12. The headstock assembly 20 comprises a string nut-supporting unit 58 attached to the base track 26. The string nut-supporting unit 58 comprises a screw, such as a thumb screw, for securing the string nut-supporting unit 58 in a desired location on the base track 26. The string nut-supporting unit 58 is configured to support and secure a string nut assembly 38 mounted thereon.

In an embodiment, the string nut assembly 38 is mounted to the string nut-supporting unit 58. As a result, the position of the string nut assembly 38 along the side tracks 25 may be adjusted with the movement of the string nut-supporting unit 58. The string nut assembly 38 comprises a first string nut substrate 60 directly attached to the string nut-supporting unit 58, a nut slot 62 extending along the length of the first string nut substrate 60, and a string nut 64 positioned within the nut slot 62. The string nut 64 is configured to slide into different positions on the nut slot 62 to accommodate various types of strings with different diameters.

The string nut 64 comprises a plurality of string slots, wherein one or more of the string slots may have different sizes to accommodate various types of strings. Depending on the desired string slot, the string nut 64 is positioned in the nut slot 62 such that the string 44 extends substantially across the center of the first string nut substrate 60. The first string nut substrate 60 may be made from a variety of suitable materials, including wood, plastic, metal, and any combinations thereof.

Alternative embodiments of the apparatus 10 may have string nuts with different nut configurations, such as a clamp-style nut configuration, which does not use a slot or moving nut. Instead, it serves a string final endpoint and may allow for eliminating the extension of the string beyond the nut to rest of the headstock assembly.

Figure 9:
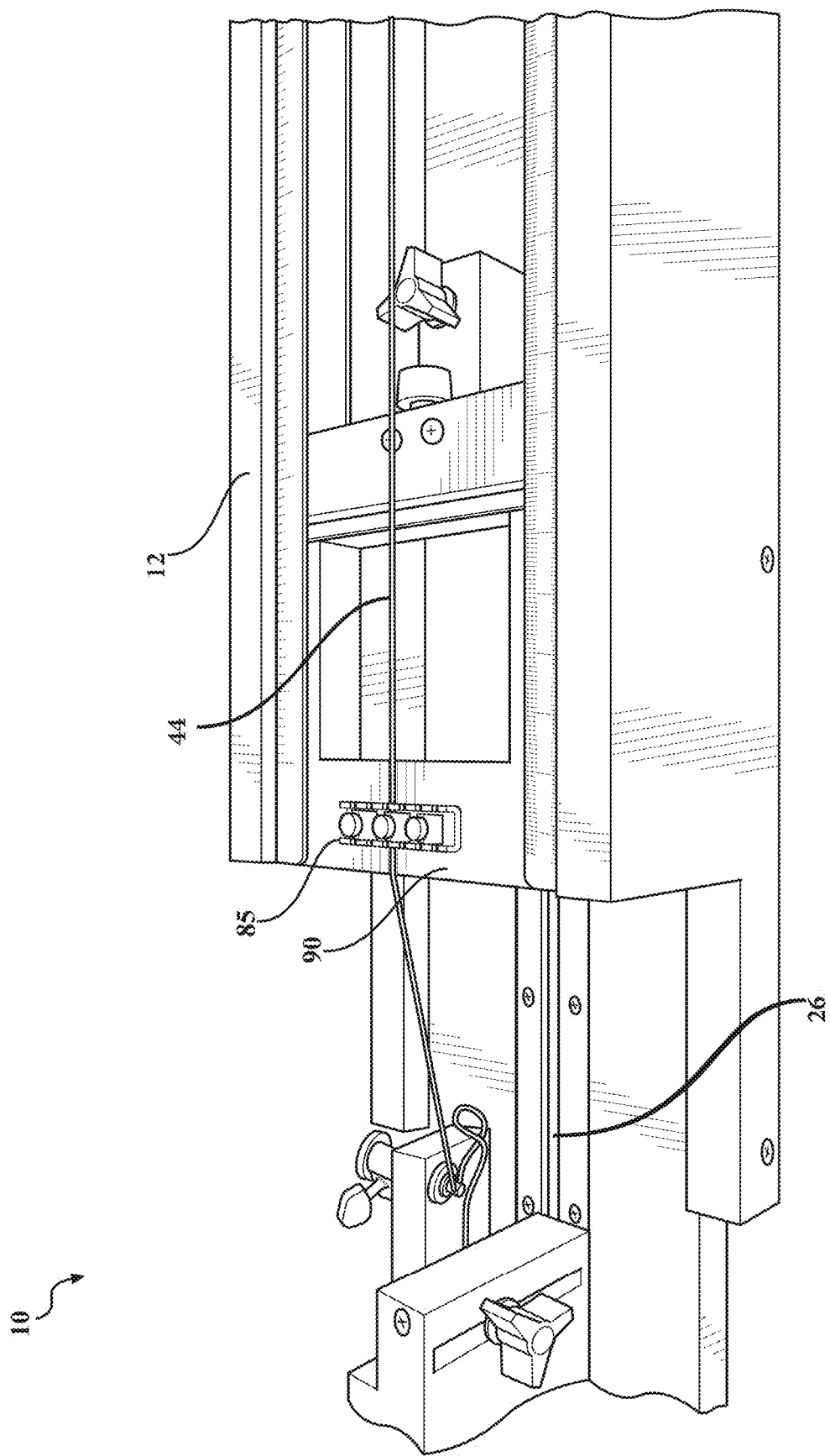
FIG. 9 illustrates a schematic perspective view of a portion of the string instrument emulating and tension measuring apparatus illustrated in FIGS. 1-6 and 8 having an alternative string nut assembly.

FIG. 9 illustrates a view of the apparatus 10 comprising an alternative string nut assembly 85. The string nut assembly 85 depicted in FIG. 9 is a clamp-style string nut assembly, but other nut assemblies are also possible in other embodiments. The clamp-style string nut assembly 85 may be made from a variety of materials, including brass. The clamp-style string nut assembly 85 is mounted upon a second string nut substrate 90. The second string nut substrate 90 is configured to slide into the two side tracks 25 and to brace against the first string nut substrate 60. This provides an alternative to bolting the first string nut substrate 60 to portions of the apparatus 10.

The headstock assembly 20 further comprises one or more tuning assemblies 42 configured to secure upper ends of instrument strings under tension. In an embodiment, each tuning assembly 42 comprises one or more tuning pegs 82, one more tuning gears, and one or more tuning barrels 84, wherein the tuning barrel 84 includes an aperture to accommodate the insert of a string. The size and amount of the apertures may vary in order to accommodate strings of various diameters. In an embodiment, one end of the string 44 is attached to the bridge unit 32 while the other end of the string 44 is attached to the tuning barrel 84 of the tuning assembly 42.

In an embodiment, the tuning assembly 42 may be attached to a first tuning mount 68 using a fastener (e.g. a bolt and a nut), wherein the first tuning mount 68 is attached to a second tuning mount 70. The first tuning mount 68 in conjunction with the second tuning mount 70 are configured to emulate a headstock on an instrument by emulating the angle and distance from the string nut 64 to the tuning barrel 84. The length of the string 44 is affected by changing the distance between the string nut 64 and the tuning barrel 84, along with the angle taken by the line of a string from the string nut 64 to the tuning barrel 84. The first tuning mount 68 may be made from a variety of suitable rigid materials, such as wood, plastic, metal, and any combinations thereof. The first tuning mount 68 may have a thickness similar to that of a headstock on an instrument.

The second tuning mount 70 is mounted to the base track 26 and is configured to support and secure the tuning assembly 42. In an embodiment, a first thumb screw 74 may be inserted through a slot on the second tuning mount 70 to secure the first tuning mount 68 at a desired height to emulate a desired headstock angle of an instrument. The slot on the second tuning mount 70 allows for the positioning of the first tuning mount 68 at any desired height. A second thumb screw 78 allows for the second tuning mount 70 to be secured in a desired, lateral location on the base track 26.

Figure 8:
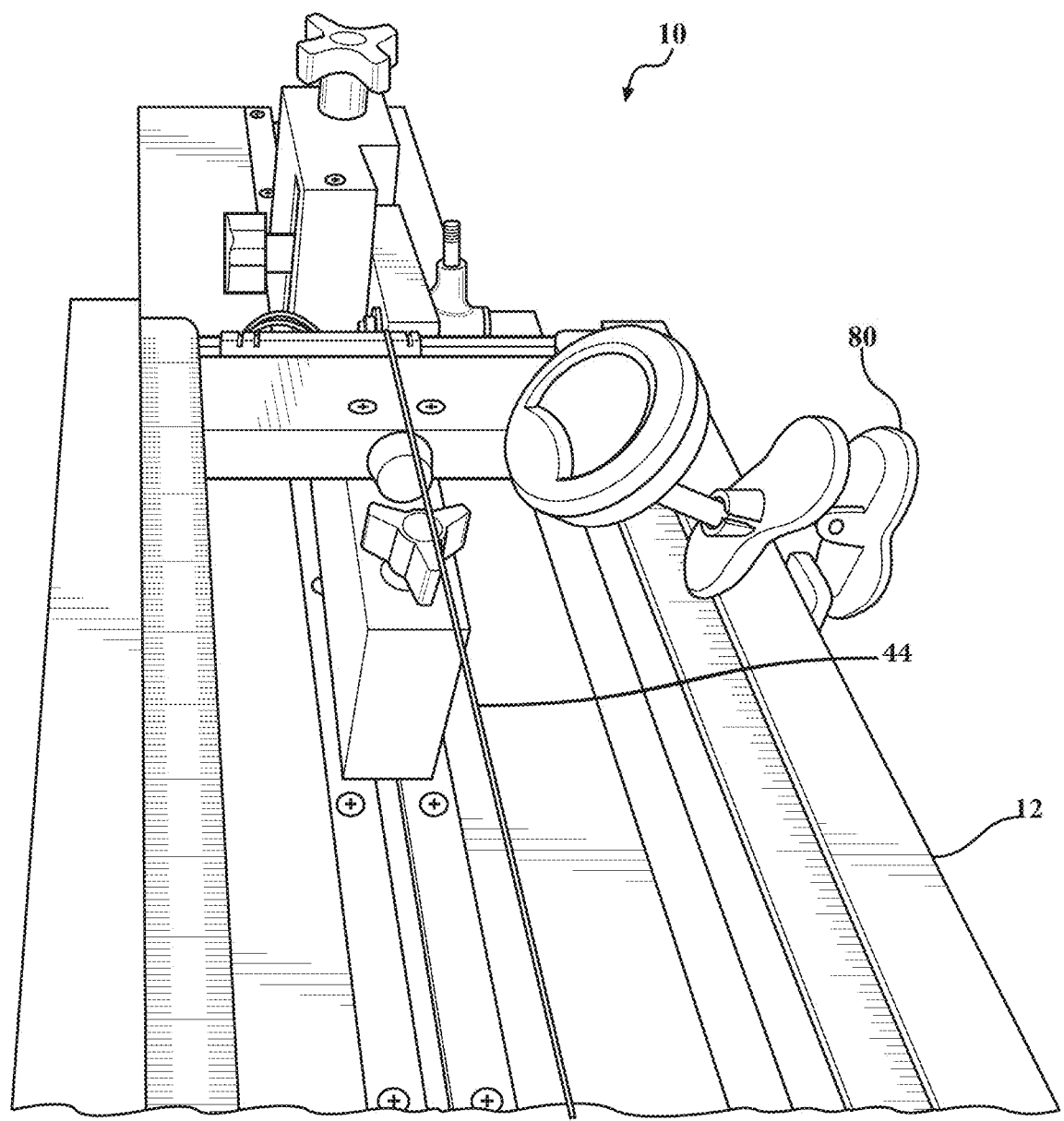
FIG. 8 illustrates a schematic perspective view of a pitch-measuring assembly attached to the apparatus illustrated in FIGS. 1-6.

A pitch-measuring assembly 80 may be attached to one or more components of the apparatus 10. The pitch-measuring assembly 80 may comprise a variety of different assemblies configured to measuring pitch, such as a standard tuner, as illustrated in FIG. 8. The pitch-measuring assembly 80 is configured to measure a pitch, in real-time, generated by a given string type, a given instrument configuration, etc. The pitch-measuring assembly 80 may be attached to the components of the apparatus 10 in a variety of ways, including being clipped on. In a non-limiting embodiment, the pitch-measuring assembly 80 may be connected to the elongated body 12 adjacent to the headstock assembly 20. In an embodiment, the pitch measuring assembly 80 may read pitch without being attached to the apparatus 10 by being placed adjacent to the apparatus 10.

In some embodiments, the apparatus 10 disclosed herein may be used to measure the total tension of a set of strings, such as 4 (like a ukulele or violin) or 6 (like a standard guitar). In this embodiment, the first tuning mount 68 may be modified to accommodate more tuning assemblies and bear the higher associated string tension. Additionally, the second tuning mount 70 and the mount 52 of the tension-measuring assembly 18 may also be modified to bear the higher associated string tension.

Figure 13:
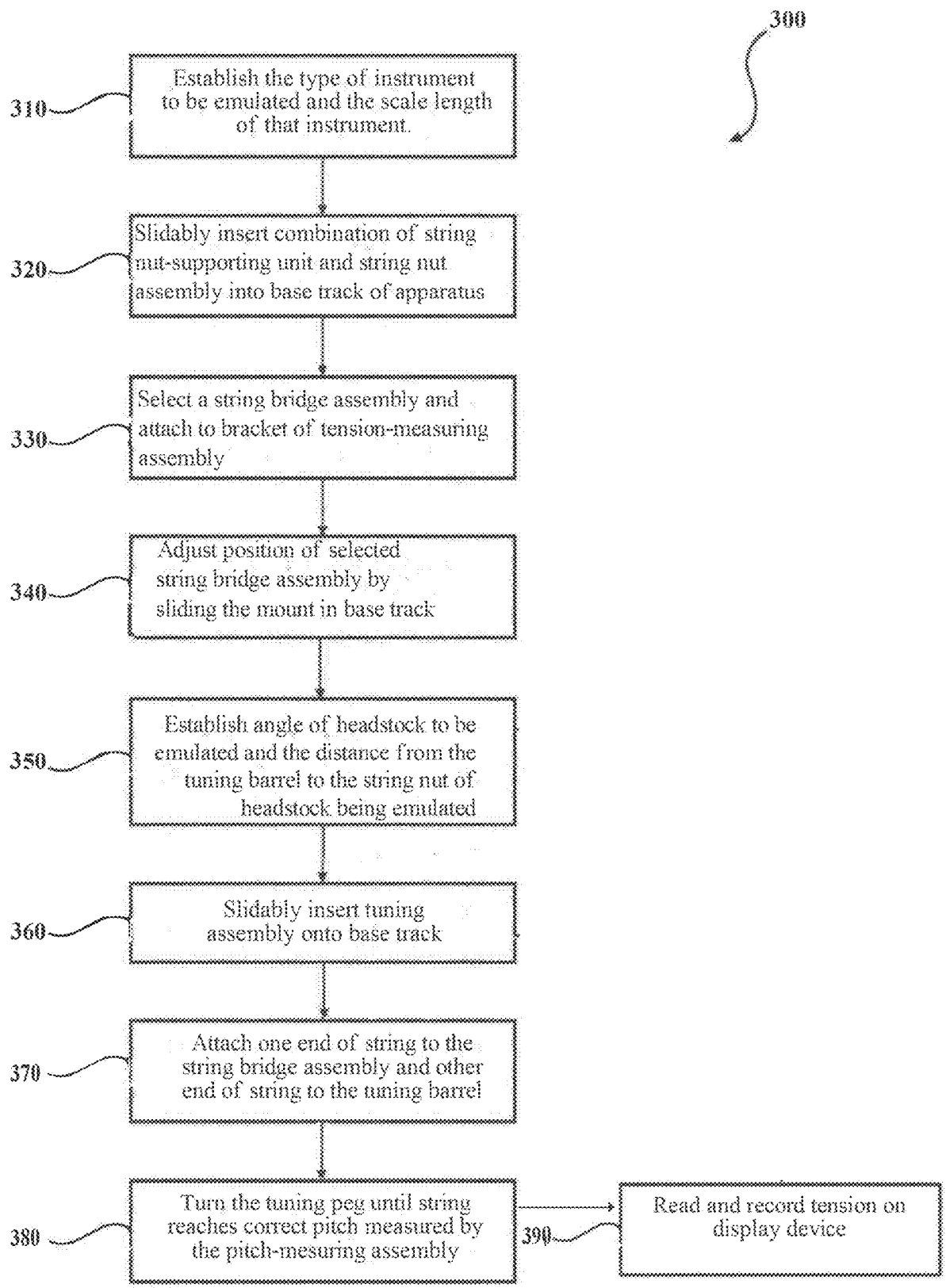
FIG. 13 illustrates an exemplary method for measuring the tension of a string on an instrument using the apparatus illustrated in FIGS. 1-6, 8, and 9.

FIG. 13 illustrates an exemplary method 300 for measuring the tension of a string on an instrument using the apparatus 10 illustrated in FIGS. 1-6, 8, and 9. The method 300 commences at block 310 by establishing the type of instrument to be emulated and the scale length of instrument to be emulated using the apparatus 10. This may involve calibrating/resetting the apparatus 10 to 0.

Next, as shown in block 320, the combination of the string nut-supporting unit 58 attached to the string nut assembly 38 is slidably inserted into the base track 26 such that the edge of the string nut 64 that is closest to the first end 14 of the elongated body 12 is aligned at the 0 point on one or more of the rulers 28 of the apparatus 10.

Then, as shown in block 330, an appropriate string bridge assembly, such as the string bridge assembly 30 disclosed herein, is selected for the chosen instrument and attached to the bracket 56 of the tension-measuring assembly 18.

As shown in block 340, the position of the string bridge assembly 30 is adjusted by sliding the mount 52 in the base track 26. The result is that the final point of contact of the string 44 with the string bridge assembly 30 closest to the second end 16 of the elongated body 12 is aligned at the measurement point on one or more of the rulers 28, which is equal to the scale length of the chose instrument.

As shown in block 350, the angle created at the point where a line running along the top surface of a headstock intersects with a line running along the top surface of a fingerboard of an instrument to be emulated is established. Additionally established, is the distance of line running along the top surface of the headstock from the tuner barrel of the string being tested for tension to the edge of the nut on that instrument, wherein the edge is closest to the bridge of that instrument and wherein the string being test crosses the nut.

Next, as shown in block 360, the tuning assembly 42 is inserted into the base track 26 to a location on the base track 26. The second mount 68 is set to a height on the first mount 70 such that it creates the distance and angle established in the previous paragraph of a line from the tuning barrel 84 to an edge of the string nut 64 that is closest to the first end 14 of the elongated body 12.

As shown in block 370, one end of the string 44 is attached to the string bridge assembly 30 and the other end of the string 44 is attached to the tuning barrel 84. Next, the tuning peg 82 is turned until the string 44 reaches the correct pitch as measured by the pitch-measuring assembly 80, as shown in block 380.

As shown in block 390, the tension is read and recorded by the display device 24 of the tension-measuring assembly 18. For example, the tension may be recorded upon observing the same pitch displayed by the pitch-measuring assembly 80 multiple times over at least 5 minutes. In some embodiments, the instrument type, scale length, pitch, and string gauge may also be read and recorded.

Figure 10:
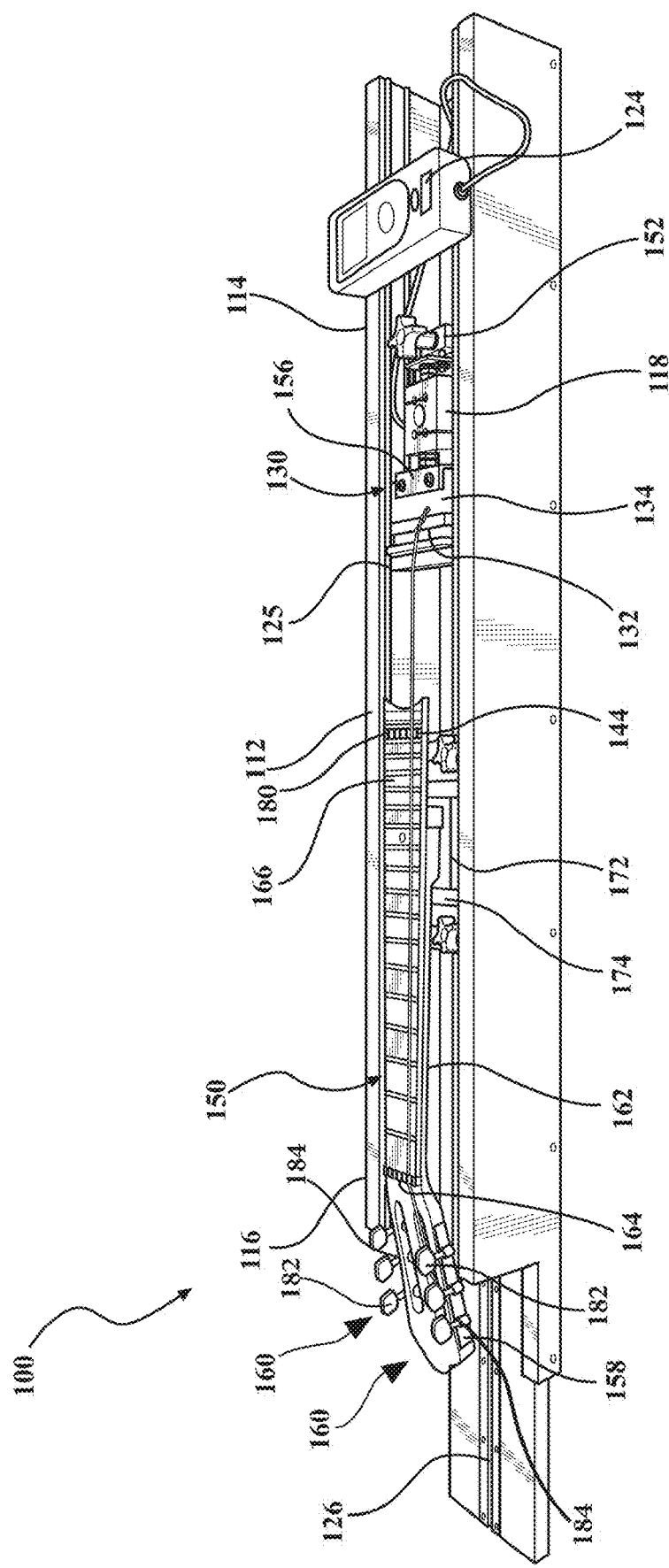
FIG. 10 illustrates a schematic side, perspective view of a string instrument emulating and tension measuring apparatus according to an alternative embodiment of the disclosure.
Figure 11:
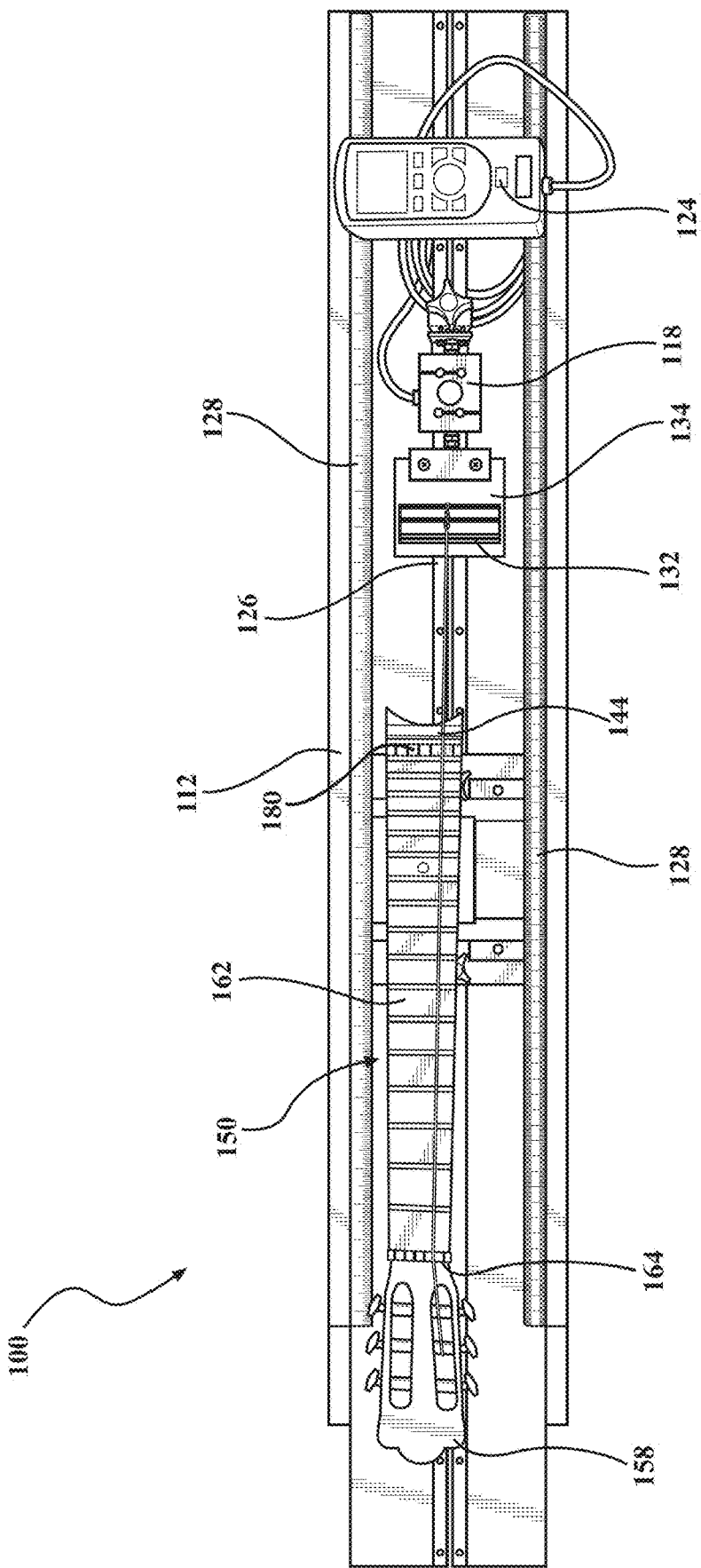
FIG. 11 illustrates a schematic top view of the string instrument emulating and tension measuring apparatus illustrated in FIG. 10.

FIGS. 10 and 11 illustrate views of a string instrument emulating and tension measuring apparatus 100 according to an alternative embodiment of the disclosure. The apparatus 100 comprises an elongated body 112 having a first end 114 and a second end 116. The elongated body 112 includes a base track 126 mounted to the floor of the elongated body 112 and extending along the entire length of the elongated body 112.

In an embodiment, the apparatus 100 further comprises two side tracks 125 mounted on interior portions of opposing, vertical side walls of the elongated body 112. The side tracks 125 are made of a rigid material, such as a metal, a rigid plastic, and any combinations thereof, and may be oriented to face each other. As best seen in FIGS. 10 and 11 and as a non-limiting example, two rulers 128 are positioned along the length of the elongated body 112. Each of the rulers 128 is mounted on top of one of the side tracks 125.

The apparatus 100 also comprises an instrument neck assembly 150 centrally mounted to the base track 126. The instrument neck assembly 150 comprises an elongated neck portion 162, a mounting block 172, and a neck assembly supporting unit 174. The heal of the neck portion 162 is attached to the mounting block 172. The neck assembly supporting unit 174 is mounted to the base track 126. In an embodiment, the neck assembly supporting unit 174 includes a pair of screws, such as thumb screws, for securing the neck assembly supporting unit 174 in a desired location on the base track 126. As a result, the neck assembly supporting unit 174 is configured to support and secure the instrument neck assembly 150 as it slides.

In an embodiment, the neck assembly supporting unit 174 includes a pair of parallel tracks, within which the mounting block 172 slides to adjust the position of the instrument neck assembly 150. The parallel tracks are oriented to face each other and each of the tracks is made of a rigid material, such as a metal, a rigid plastic, or any combinations thereof.

The instrument neck assembly 150 is configured to slide along the length of the base track 126 to create the correct scale length and the instrument neck assembly 150 is configured to slide laterally to ensure that the force applied to the instrument neck assembly 150 is direct and not angular. This helps ensure correct alignment of an individual string (for which tension is being measured) to the correct location on a string bridge assembly 130 on the apparatus 100 or for correct alignment of the combination of strings (for which tension is being measured) to the correct locations on the string bridge assembly 130.

The instrument neck assembly 150 further comprises a headstock 158 having a plurality of tuning assemblies 160, an elongated neck portion 162, and a string nut 164 interposed between the headstock 158 and the neck portion 162.

Each of the tuning assemblies 160 comprises a plurality of tuning pegs 182, one or more tuning gears, and one or more tuning barrels 184. In the embodiment shown in FIGS. 10-12, the neck portion 162 includes a fretboard/fingerboard 166 and a string position plate 180.

Figure 12:
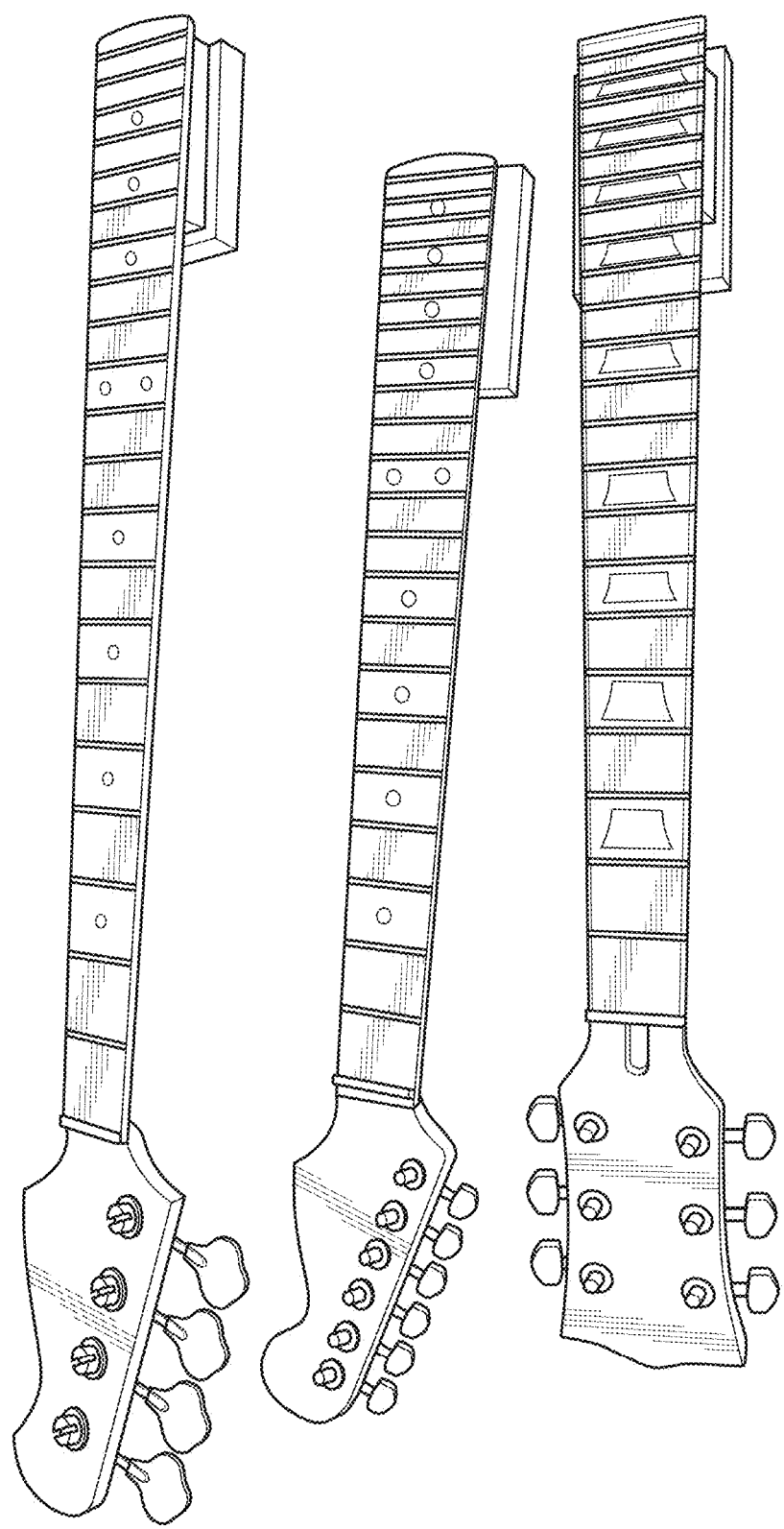
FIG. 12 illustrates a schematic perspective view examples of portions of instrument neck assemblies that may be used with the string instrument emulating and tension measuring apparatus illustrated in FIGS. 10 and 11.

As best seen in FIG. 12, the neck portions of the instrument neck assembly 150 adapted for insertion to the apparatus 100 may have different shapes, sizes, and configurations. The neck portions of the instrument neck assembly 150 disclosed herein are configured to resemble the most common types of guitars. In some embodiments, the neck portions of the instrument neck assembly 150 may be a standard electric bass neck, a standard acoustic base neck, or a standard, classical neck. The alignment and arrangement of tuners 160 may vary depending on the type of instrument neck assembly incorporated in the apparatus 100.

In an embodiment, the string bridge assembly 130 comprises a bridge substrate 134 selectively attached to a bracket 156 and a bridge unit 132, wherein the bridge unit 132 is mounted to the bridge substrate 134. The bridge substrate 134 may be made from a variety of materials, including wood, metal, plastic, and any combinations thereof. The bridge unit 132 comprises a receiver portion configured for securing one or more ends of a string 144 under tension. In an embodiment, one end of the string 144 is connected to one of the tuners 160 and the other end of the string 144 is connected to the string bridge assembly 130 as the string 144 runs over the fretboard 166. One of ordinary skill in the art would understand that a variety of string bridge assemblies may be used with the apparatus 100, particularly with different types of types of instrument neck assemblies 150.

As best seen in FIGS. 10 and 11 and as a non-limiting example, the apparatus 100 further comprises a tension-measuring assembly 118 mounted to the base track 126 of the elongated body 112. The tension-measuring assembly 118 is configured to measure the tension of the string 144. The position of the tension-measuring assembly 118 may be adjusted and supported at one end by a mount 152 having a knob, wherein the knob tightens to secure the tension-measuring assembly 118 in a particular position. The mount 152 is affixed to and moves along the base track 126.

At the other end, the tension-measuring assembly 118 may be rigidly attached to a bracket 156 that is configured to support the string bridge assembly 130. The bracket 156 may be rigidly affixed to the tension-measuring assembly 118 by a threaded bolt. The bracket 156 may be made from a variety of rigid materials, including wood, plastic, metal, and any combinations thereof.

As best seen in FIGS. 10 and 11 and as a non-limiting example, the tension-measuring assembly 118 is in communication with a display device 124 either through wireless or wired interfaces. In an embodiment, the display device 124 rests on top of a display device mount such that the display device 124 is secured between two side tracks 125 mounted on interior portions of opposing, vertical side walls of the elongated body 112. The display device 124 is configured to display the tension of the string 44 measured by the tension-measuring assembly 118. Wireless interfaces may provide for communication under one or more wireless communication protocols, such as Bluetooth, Wi-Fi, LTE, RFID protocol, and/or other wireless communication protocols.

The addition of the instrument neck assemblies disclosed herein to the apparatus 100 eliminates the need to recreate potential headstock positions, headstock dimensions, nut placement positions, nut placement angles, nut designs, and neck dimensions of a string instrument. As a result, a significant amount of time may be saved from not having to measure and imitate the length and angles of the headstock for most commonly used headstocks. The headstocks on these instrument neck assemblies are positioned on opposite ends of the apparatus 100 from the tension-measuring assembly 118 and the string bridge assembly 130.

The apparatus 100 also comprises a pitch-measuring assembly (e.g. a tuner) configured to measure a pitch, in real-time, generated by a given string type, a given instrument configuration, etc. In an embodiment, the pitch-measuring assembly may be attached to one or more components of the apparatus 100. In an alternative embodiment, a pitch-measuring assembly may read pitch by being adjacent to the apparatus 100, without being attached to the apparatus 100.

FIG. 14 illustrates an exemplary method 400 for measuring the tension of a string on an instrument using the apparatus 100 illustrated in FIGS. 10-12. The method 400 commences at block 410 by establishing the type of instrument to be emulated and the scale length of that instrument.

Next, in block 420, the instrument neck assembly 150 for the chosen instrument is slidably inserted into the neck assembly supporting unit 174, which is then inserted into the base track 126 at the second end 116 of the elongated body 112. For example, the neck assembly supporting unit 174 may be inserted into the base track 126 such that an edge of the string nut 164 that is closes to the first end 114 of the elongated body 112 is aligned at the 0 point on at least one of the rulers 128.

As shown in block 430, an appropriate string bridge assembly for the chosen instrument, such as the string bridge assembly 130 of the apparatus 100, is selected and attached to the bracket 156 of the tension-measuring assembly 118.

Next, the position of the selected bridge assembly, such as the string bridge assembly 130, is adjusted by sliding the first mount 152 in the base track 126, as shown in block 440. For example, the string bridge assembly 130 is adjusted such that the final point of contact of the string 144 with the string bridge assembly 130 that is closest to the second end 116 is aligned at the measurement point on one or more of the rulers 128, which is equal to the scale length of the chose instrument.

As shown in block 450, one end of the string 144 is attached to the string bridge assembly 130 and the other end of the string 144 is attached to one of the tuning barrels 184. This corresponds to the position of the string 144 being tested for tension.

Next, as show in block 460, the mounting block 172 of the neck assembly supporting unit 174 slides laterally to set a desired position on the instrument neck assembly 150. For example, the mounting block 172 may slide into a position where the point contact of a portion of the string 144 in the string nut 164 is in direct alignment with the point of contact of a portion of the string 144 with the string bridge assembly 130 such that the string 144 aligns at a 90-degree angle to the string nut 164.

In an alternative embodiment, the mounting block 172 of the neck assembly supporting unit 174 slides laterally to a desired position on the instrument neck assembly 150 such that a portion of the string 144 is aligned at the $12^{th}$ fret on the fretboard 166. In this embodiment, the portion of the string 144 may be positioned over a string position mark on the string position plate 180.

As shown in block 470, one or more the tuning pegs 182 are turned until the string 144 reaches a correct pitch, as measured by a pitch-measuring assembly. Then, the tension displayed on the display device 124 of the tension-measuring assembly 118 is read and recorded, as shown in block 480. For example, the tension may be recorded after observing the same pitch displayed by a pitch-measuring assembly multiple times over at least five minutes. In some embodiments, the instrument type, scale length, pitch, and string gauge are also recorded, in addition to the tension.

The present disclosure offers significant benefits as compared to known apparatuses. For example, the instrument emulating string tension measuring apparatuses disclosed herein can emulate one or more string instruments without being required to attach to any stringed instrument. The string tension measuring apparatuses may measure string tension by taking into account a variety of conditions and instrument configurations. In doing so, the apparatuses may recreate potential head stock positions, nut placement positions, nut placement angles, nut designs, bridge assembly designs, and neck dimensions of a string instrument.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to form the inventive concepts defined in the appended claims.

In accordance with the provisions of the patent statutes, the present disclosure has been described to represent what is considered to represent the preferred embodiments. However, it should be noted that this disclosure can be practiced in other ways than those specifically illustrated and described without departing from the spirit or scope of this disclosure.

What is claimed is:

1. A string tension measuring apparatus comprising;
an elongated body having a first end and a second end, and one or more tracks, wherein one or more rulers are positioned along the elongated body;
a tension-measuring assembly mounted to the tracks on the first end of the body for longitudinal adjustment along the body, wherein the tension-measuring assembly includes a string bridge assembly flexibly supported by the tension-measuring assembly, and wherein the string bridge assembly includes a string bridge mounted on a substrate;
a string nut assembly secured to the tracks;
a headstock assembly mounted to the tracks on the second end of the body for longitudinal and height adjustment relative to the string nut assembly, wherein the headstock assembly comprises a tuning assembly for securing upper ends and adjusting tension of instrument strings under tension; and
a display device in communication with the tension-measuring assembly for displaying the tension of instrument strings secured under tension between the string bridge assembly and the tuning assembly.

2. The string tension measuring apparatus of claim 1, wherein the tuning assembly comprises one or more tuning pegs and a tuning barrel, wherein the tuning barrel is configured to receive an end on an instrument string.

3. The string tension measuring apparatus of claim 1, further comprising a string nut-supporting unit attached to the body, wherein the string nut assembly is mounted on the string nut-supporting unit.

4. The string tension measuring apparatus of claim 3, wherein the string nut assembly comprises:
a string nut substrate directly attached to the string nut-supporting unit;
a nut slot extending along the length of the string nut substrate; and
a string nut positioned within the nut slot.

5. The string tension measuring apparatus of claim 1, wherein the tuning assembly is attached to a tuning mount that is attached to the body.

6. The string tension measuring apparatus of claim 5, wherein the tuning mount includes one or more screws configured for adjusting the position of the tuning mount on the body.

7. The string tension measuring apparatus of claim 1, further comprising a pitch-measuring assembly connected to the second end of the body.

8. The string tension measuring apparatus of claim 1, wherein the substrate is attached to the tension-measuring assembly by a cantilever bracket.

9. A string tension measuring apparatus comprising:
an elongated body having first end and a second end, and a first set of tracks, wherein one or more rulers are positioned along the elongated body;
a tension-measuring assembly mounted on the first set of tracks on first end of the body for longitudinal adjustment along the body, wherein the tension-measuring assembly includes a string bridge assembly flexibly supported by the tension-measuring assembly, and wherein the string bridge assembly includes a string bridge mounted on a substrate;
an instrument neck assembly slidably connected to the second end of the body, wherein the instrument neck assembly comprises:
a headstock having one or more tuning assemblies, wherein the tuning assemblies are configured to receive an end of instrument string and adjust tension of instrument strings under tension;
a neck portion adjacent to the headstock, wherein the neck portion includes a fretboard;
a nut interposed between the headstock and the neck portion;
a neck assembly supporting unit mounted to the first set of tracks; and
a mounting block attached to the body; and
a display device in communication with the tension-measuring assembly for displaying the tension of instrument strings.

10. The string tension measuring apparatus of claim 9, wherein the display device is secured between the first set of tracks and wherein the display device is positioned on top of a display device mount.

11. The string tension measuring apparatus of claim 9, wherein the substrate is attached to the tension-measuring assembly by a cantilever bracket.

12. The string tension measuring apparatus of claim 9, wherein each of the tuning assemblies comprises one or more tuning pegs and one or more tuning barrels, wherein the tuning barrels are configured to receive an end on an instrument string.

13. The string tension measuring apparatus of claim 9, wherein the neck assembly supporting unit includes a second set of tracks, and wherein the mounting block is slidably disposed within the second set of tracks.

14. A method of measuring the tension of a string on an instrument, the method comprising:
providing a string tension measuring apparatus, the apparatus comprising:
an elongated body having a first end and a second end;
one or more tracks;
a tension-measuring assembly mounted to the tracks on the first end of the body; and a display device in communication with the tension-measuring assembly;

establishing the type of instrument to be emulated and the scale length of the instrument;

slidably inserting a combination of a string nut-supporting unit and a string nut assembly, into one or more tracks of the body;

selecting an appropriate string bridge assembly for the instrument to be emulated;

attaching the selected string bridge assembly to a bracket on the tension-measuring assembly;

adjusting the position of the selected string bridge assembly by sliding a mount into one or more of the tracks;

establishing an angle of headstock and a distance from a tuning barrel to a string nut for the instrument to be emulated;

slidably inserting a tuning assembly into one or more of the tracks, wherein the tuning assembly includes a tuning peg and a tuning barrel;

attaching one end of the string to the selected string bridge assembly and the other end of the string to the tuning barrel;

turning the tuning peg; and reading and recording the tension of the string using the display device.

15. The method of claim 14, wherein the tension of the string may be recorded upon observing the same pitch multiple times over at least five minutes, as displayed by a pitch-measuring assembly positioned on the apparatus.

16. A method of measuring the tension of a string on an instrument, the method comprising:

providing a string tension measuring apparatus, the apparatus comprising:

an elongated body having a first end and a second end;

one or more tracks;

a tension-measuring assembly mounted to the tracks on the first end of the body;

one or more tuning assemblies, wherein each of the tuning assemblies includes one or more tuning pegs and one or more tuning barrels; and a display device in communication with the tension-measuring assembly;

establishing the type of instrument to be emulated and the scale length of the instrument;

slidably inserting a combination of an instrument neck assembly and a neck assembly supporting unit into one or more tracks of the body;

selecting an appropriate string bridge assembly for the instrument to be emulated;

attaching the selected string bridge assembly to a bracket on the tension-measuring assembly;

adjusting the position of the selected string bridge assembly by sliding a mount into one or more of the tracks;

attaching one end of the string to the selected string bridge assembly and the other end of the string to the tuning barrel;

laterally sliding a mounting block to set a desired position on the inserted instrument neck assembly;

turning the tuning peg; and reading and recording the tension of the string using the display device.

17. The method of claim 16, wherein the tension of the string may be recorded upon observing the same pitch multiple times over at least five minutes, as displayed by a pitch-measuring assembly positioned on the apparatus.

* * * * *